United States Patent
Kim et al.

(10) Patent No.: US 12,065,133 B2
(45) Date of Patent: Aug. 20, 2024

(54) APPARATUS FOR CONTROLLING VEHICLE, SYSTEM HAVING SAME AND METHOD THEREOF

(71) Applicants: Hyundai Motor Company, Seoul (KR); Kia Motors Corporation, Seoul (KR)

(72) Inventors: Dae Young Kim, Gyeonggi-do (KR); Young Min Han, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/195,302

(22) Filed: Nov. 19, 2018

(65) Prior Publication Data
US 2020/0101968 A1  Apr. 2, 2020

(30) Foreign Application Priority Data
Sep. 28, 2018 (KR) .................. 10-2018-0115881

(51) Int. Cl.
*B60W 30/09* (2012.01)
*B60Q 9/00* (2006.01)
(Continued)

(52) U.S. Cl.
CPC ............. *B60W 30/09* (2013.01); *B60Q 9/008* (2013.01); *B60W 30/0956* (2013.01);
(Continued)

(58) Field of Classification Search
CPC .. B60W 30/09; B60W 30/0956; B60W 30/16; B60W 2554/00; B60W 2754/30;
(Continued)

(56) References Cited

U.S. PATENT DOCUMENTS 5,754,099 A * 5/1998 Nishimura ........... G05D 1/0289
                                                 342/70
6,223,117 B1 * 4/2001 Labuhn ................. B60W 30/16
                                                340/436

(Continued)

FOREIGN PATENT DOCUMENTS

EP        1726513 A1    11/2006
JP     H10338057 A     12/1998
(Continued)

OTHER PUBLICATIONS

Notice of Allowance for Korean Patent Application No. 10-2018-0115881 from the Korean Intellectual Property Office dated Sep. 25, 2023, 4 pages, with English translation.

(Continued)

*Primary Examiner* — Ig T An
(74) *Attorney, Agent, or Firm* — Fox Rothschild LLP

(57) ABSTRACT

An apparatus for controlling a host vehicle may include: a processor configured to calculate a cut-in possibility in which a nearby vehicle cuts into a lane on which the host vehicle travels ahead of the host vehicle, to determine a plurality of cut-in steps of the calculated cut-in possibility, and to control operation of the host vehicle so as to perform an inter-vehicle distance control operation or to provide a warning to a user of the host vehicle based on a state of the user in each of the plurality of cut-in steps; and storage configured to store the calculated cut-in possibility.

16 Claims, 9 Drawing Sheets

(51) Int. Cl.
*B60W 30/095* (2012.01)
*B60W 30/16* (2020.01)

(52) U.S. Cl.
CPC ......... *B60W 30/16* (2013.01); *B60W 2400/00* (2013.01); *B60W 2554/00* (2020.02); *B60W 2710/30* (2013.01); *B60W 2754/30* (2020.02)

(58) Field of Classification Search
CPC .......... B60W 2400/00; B60W 2710/30; B60Q 9/008
See application file for complete search history.

(56) References Cited

U.S. PATENT DOCUMENTS

| | | | |
|---|---|---|---|
| 2004/0090319 | A1 | 5/2004 | Kimura et al. |
| 2008/0243351 | A1* | 10/2008 | Isogai ................... B60W 30/16 701/96 |
| 2011/0144859 | A1 | 6/2011 | Suk et al. |
| 2012/0206252 | A1 | 8/2012 | Sherony et al. |
| 2016/0280264 | A1 | 9/2016 | Baek |
| 2016/0304097 | A1 | 10/2016 | Taira et al. |
| 2017/0325732 | A1 | 11/2017 | Kodama et al. |
| 2017/0341652 | A1 | 11/2017 | Sugawara et al. |
| 2018/0170327 | A1 | 6/2018 | Lee et al. |
| 2018/0215389 | A1 | 8/2018 | Takae |
| 2018/0222423 | A1 | 8/2018 | Takae et al. |
| 2018/0268696 | A1 | 9/2018 | Morotomi et al. |
| 2020/0086866 | A1* | 3/2020 | Miura .................... G08G 1/167 |

FOREIGN PATENT DOCUMENTS

| | | | | |
|---|---|---|---|---|
| JP | 2003-039978 | A | 2/2003 | |
| JP | 2006-205860 | A | 8/2006 | |
| KR | 10-2013-0040101 | A | 4/2013 | |
| KR | 10-2013-0078399 | A | 7/2013 | |
| KR | 10-2014-0049255 | A | 4/2014 | |
| KR | 10-1399026 | B1 | 5/2014 | |
| KR | 10-2015-0101621 | A | 9/2015 | |
| KR | 10-2017-0108239 | A | 9/2017 | |
| KR | 20170108239 | * | 9/2017 | ............... B60T 8/24 |

OTHER PUBLICATIONS

Notification of the First Office Action from China National Intellectual Property Administration for Chinese Patent Application No. 20181450934.X, mailed Mar. 4, 2024, with English translation, 19 pages.
Yuanshui, H., "Forward collision avoidance warning system based on milimeter wave radar", Mechanical & Electrical Technology, 2017, (01), 5 pages.
Wang, X. et al., "Cut-In Behavior Analyses Based on Naturalistic Driving Data", Journal of Tongji University (Natural Science), vol. 46, No. 8, Aug. 2018, 7 pages.

* cited by examiner

APPARATUS FOR CONTROLLING VEHICLE, SYSTEM HAVING SAME AND METHOD THEREOF

CROSS-REFERENCE TO RELATED APPLICATION

This application claims the benefit of priority to Korean Patent Application No. 10-2018-0115881, filed in the Korean Intellectual Property Office on Sep. 28, 2018, the entire contents of which are incorporated herein by reference.

TECHNICAL FIELD

The present disclosure relates generally to an apparatus for controlling a vehicle, a system having the same, and a method thereof, and more particularly, an apparatus for controlling a vehicle, a system having the same, and a method thereof capable of detecting a "cut-in vehicle" and performing guidance and control of the vehicle in advance.

BACKGROUND

Recently, with the rapid development of information technology (IT), interest in "intelligent" vehicles equipped with vision systems has increased. Advanced safety automobile technologies, such as lane departure detection, lane keeping systems, inter-vehicle distance control systems, collision warning systems, lane change control systems, or the like, each of which reduces the risk of traffic accidents and helps safe driving, are based on intelligent automobile technology.

Inter-vehicle distance control systems are generally designed to control operation of the vehicle ("host vehicle") to assist in safe travel, e.g., by keeping the host vehicle at a predefined distance from a preceding vehicle in front of the host vehicle. However, since conventional inter-vehicle distance control systems only warn about a control limit situation, that is, a risk of collision with a preceding vehicle (i.e., a take-over request) or a recognition limit situation (i.e., a forward alert notification), when a vehicle traveling in a nearby lane rapidly cuts into the lane in which the host vehicle is driving, sudden braking control may be performed which can startle and cause discomfort for the driver.

SUMMARY

The present disclosure has been made to solve the above-mentioned problems occurring in the related art while advantages achieved by the prior art are maintained intact.

An aspect of the present disclosure provides an apparatus for controlling a vehicle, a system having the same, and a method thereof, capable of providing a user with advance warning of a "cut-in situation" in which another vehicle in a nearby lane cuts into the lane in which the host vehicle is driving, thereby minimizing a sense of helplessness when an inter-vehicle distance control system automatically applies the brakes of the host vehicle in response to the other vehicle cutting into the lane of the host vehicle.

Another aspect of the present disclosure provides an apparatus for controlling a vehicle, a system having the same, and a method thereof, capable of giving a warning to a user or identifying a "cut-in vehicle" (i.e., a vehicle cutting into the lane of the host vehicle) as a target ("control target") so as to control operation of the vehicle to maintain an inter-vehicle distance, thereby preventing a collision between the host vehicle and the cut-in vehicle.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, an apparatus for controlling a host vehicle may include: a processor configured to calculate a cut-in possibility in which a nearby vehicle cuts into a lane on which the host vehicle travels ahead of the host vehicle, to determine a plurality of cut-in steps of the calculated cut-in possibility, and to control operation of the host vehicle so as to perform an inter-vehicle distance control operation or to provide a warning to a user of the host vehicle based on a state of the user in each of the plurality of cut-in steps; and storage configured to store the calculated cut-in possibility.

The plurality of cut-in steps may include a first cut-in step in which the cut-in possibility is greater than a first reference value and less than a second reference value and the inter-vehicle distance control is not performed after the nearby vehicle cuts into the lane on which the host vehicle travels ahead of the host vehicle; and a second cut-in step in which the cut-in possibility is greater than the second reference value and the inter-vehicle distance control is performed after the nearby vehicle cuts into the lane on which the host vehicle travels ahead of the host vehicle.

The state of the user may indicate at least one of whether the user looks ahead and whether a hand of the user is put on a steering wheel of the host vehicle.

In the first cut-in step, the warning may not be provided, and in the second cut-in step, the processor may provide the warning and to output a warning level based on at least one of whether the user looks ahead and whether the hand of the user is put on the steering wheel.

In the second cut-in step, the processor may output a visual warning when the user looks ahead or the hand of the user is put on the steering wheel.

In the second cut-in step, the processor may output at least one of an audible warning and a tactile warning while outputting a visual warning when the user does not look ahead or the hand of the user is not put on the steering wheel.

In the first and second cut-in steps, the processor may provide the warning and output a warning level based on at least one of whether the user looks ahead and whether the hand of the user is put on the steering wheel.

The processor may output a visual warning when the user looks ahead or the hand of the user is put on the steering wheel; and output at least one of an audible warning and a tactile warning while outputting the visual warning when the user does not look ahead or the hand of the user is not put on the steering wheel.

In the first cut-in step, the processor may perform the inter-vehicle distance control operation with regard to the nearby vehicle as a control target based on at least one of whether the user looks ahead and whether the hand of the user is put on the steering wheel; and in the second cut-in step, the processor may perform the inter-vehicle distance control operation with regard to the nearby vehicle as the control target without regard to whether the user looks ahead or whether the hand of the user is put on the steering wheel.

In the first cut-in step, the processor may perform the inter-vehicle distance control operation with regard to the nearby vehicle as the control target when the user does not look ahead or the hand of the user is not put on the steering wheel.

Furthermore, according to embodiments of the present disclosure, a vehicle system may include: an image obtaining device configured to obtain an image around a host vehicle; a sensing module configured to obtain information about an obstacle around the host vehicle; and a vehicle control apparatus configured to calculate a cut-in possibility in which a nearby vehicle cuts into a lane on which the host vehicle travels ahead of the host vehicle, to determine a plurality of cut-in steps of the calculated cut-in possibility, and to control operation of the host vehicle so as to perform an inter-vehicle distance control operation or to provide a warning to a user of the host vehicle based on at least one of whether a user looks ahead and whether a hand of the user is put on a steering wheel of the host vehicle.

The vehicle system may further include a display configured to output a visual warning according to the vehicle control apparatus; or a warning device configured to output the visual warning, a tactile warning, and an audible warning according to the vehicle control apparatus.

The display may include at least one of a head-up display (HUD), a cluster, an audio video navigation (AVN), and a side mirror.

The sensing module may include at least one of a radar, an ultrasonic sensor, and a lidar.

Furthermore, according to embodiments of the present disclosure, a method of controlling a host vehicle may include: calculating, by a processor, a cut-in possibility in which a nearby vehicle cuts into a lane on which the host vehicle travels ahead of the host vehicle; determining, by the processor, a plurality of cut-in steps of the calculated cut-in possibility; controlling, by the processor, operation of the host vehicle so as to perform an inter-vehicle distance control operation or to provide a warning to a user of the host vehicle based on a state of the user in each of the plurality of cut-in steps.

The plurality of cut-in steps may include a first cut-in step in which the cut-in possibility is greater than a first reference value and less than a second reference value and the inter-vehicle distance control is not performed after the nearby vehicle cuts into the lane on which the host vehicle travels ahead of the host vehicle; and a second cut-in step in which the cut-in possibility is greater than the second reference value and the inter-vehicle control is performed after the nearby vehicle cuts into the lane on which the host vehicle travels ahead of the host vehicle.

The controlling of the operation of the host vehicle may include in the second cut-in step, outputting, by the processor, a visual warning when the user looks ahead or the hand of the user is put on the steering wheel; and in the second cut-in step, outputting, by the processor, at least one of an audible warning and a tactile warning while outputting a visual warning when the user does not look ahead or the hand of the user is not put on the steering wheel. In the first cut-in step, the warning may not be provided.

The controlling of the operation of the host vehicle may include, in the first and second cut-in steps, outputting, by the processor, a warning level based on at least one of whether the user looks ahead and whether the hand of the user is put on the steering wheel.

The outputting of the warning level may include outputting, by the processor, a visual warning when the user looks ahead or the hand of the user is put on the steering wheel; and outputting, by the processor, at least one of an audible warning and a tactile warning while outputting the visual warning when the user does not look ahead or the hand of the user is not put on the steering wheel.

The controlling of the operation of the host vehicle may include, in the first cut-in step, performing, by the processor, the inter-vehicle distance control operation with regard to the nearby vehicle as a control target based on at least one of whether the user looks ahead and whether the hand of the user is put on the steering wheel; and in the second cut-in step, performing, by the processor, the inter-vehicle distance control operation with regard to the nearby vehicle as the control target without regard to whether the user looks ahead or whether the hand of the user is put on the steering wheel.

BRIEF DESCRIPTION OF THE DRAWINGS

The above and other objects, features and advantages of the present disclosure will be more apparent from the following detailed description taken in conjunction with the accompanying drawings.

Figure 1:
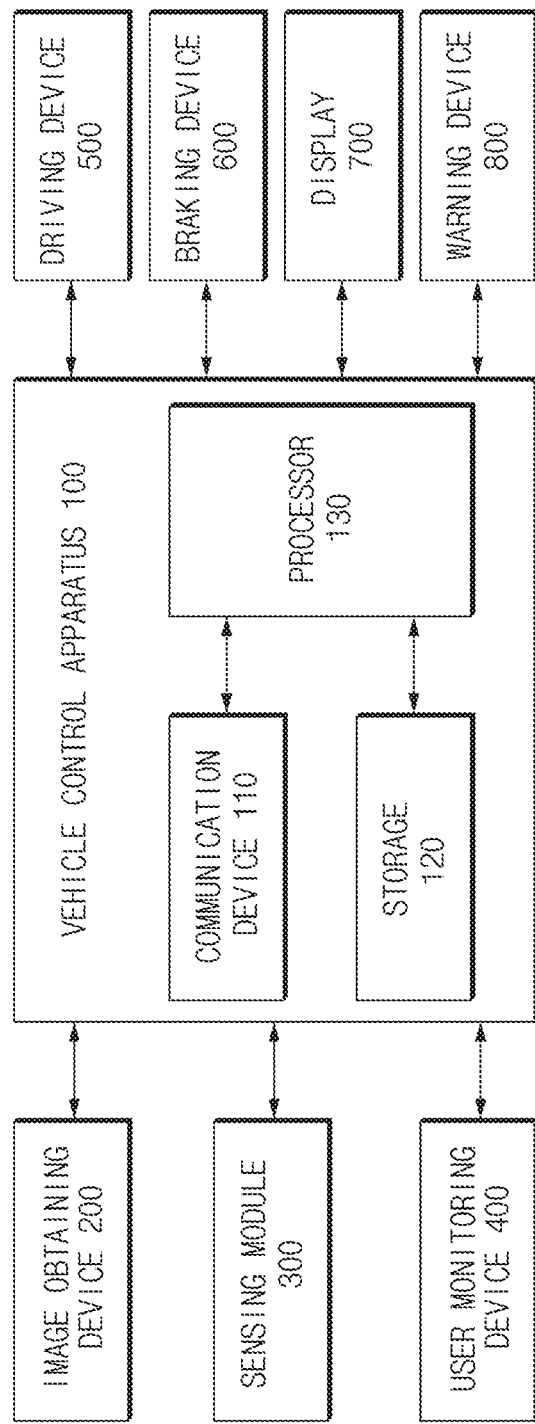
FIG. 1 is a block diagram illustrating a vehicle system including a vehicle control apparatus according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing the components of the present disclosure, terms like first, second, A, B, (a), and (b) may be used. These terms are intended solely to distinguish one component from another, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It is understood that the term it "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing execuTable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described in detail with reference to FIGS. 1 to 9.

FIG. 1 is a block diagram illustrating a vehicle system including a vehicle control apparatus according to embodiments of the present disclosure.

A vehicle system according to embodiments of the present disclosure may include a vehicle control apparatus 100, an image obtaining device 200, a sensing module 300, a user monitoring device 400, a driving device 500, a braking device 600, a display 700, and a warning device 800.

The vehicle control apparatus 100 may determine a cut-in possibility that a nearby vehicle cuts in ahead of the road on which a host vehicle (alternatively referred to herein as a "present vehicle") is traveling, determine a cut-in level of each cut-in possibility (i.e., a possibility of the nearby vehicle cutting into the lane in which the host vehicle is driving ahead of the host vehicle), and perform a warning or an inter-vehicle distance control based on the state of a user by the cut-in level. The state of the user may include whether a user is looking ahead and/or whether a user puts his hands on a steering wheel.

To this end, the vehicle control apparatus 100 may include a communication device 110, storage 120, and a processor 130.

The communication device 110 may be a hardware device implemented with various electronic circuits for transmitting and receiving a signal through a wireless or wired connection. In the present disclosure, communication in a vehicle may be performed through controller area network (CAN) communication or the like. The communication device 110 may communicate with the image obtaining device 200, the sensing module 300, the user monitoring device 400, the driving device 500, the braking device 600, the display 700, the warning device 800, and the like.

The storage 120 may store image data obtained from the image obtaining device 200 and data determined by the processor 130. The storage 120 may include a storage medium having at least one type of a flash memory type, a hard disk type, a micro type, a card type of a memory (e.g., a secure digital (SD) card, an extreme digital (XD) card, or the like), RAM (Random Access Memory), SRAM (Static Random Access Memory), ROM (Read-Only Memory), EEPROM (Electrically Erasable Programmable Read-Only Memory), PROM (Programmable Read-Only Memory), MRAM (Magnetic RAM), a magnetic disc, and an optical disc.

The processor 130 may be electrically connected to the communication device 110, the storage 120, may electrically control each component, may be an electric circuit for executing instructions of software, and may perform various data processing and calculations described below.

The processor 130 may determine a cut-in possibility that a nearby vehicle cuts in ahead of a road on which a host vehicle travels, determine a cut-in step of each cut-in possibility, and perform a warning or an inter-vehicle distance control based on a state of a user in each cut-step. In this case, the cut-in step may include a first cut-in step in which the cut-in possibility is greater than a first reference value and less than a second reference value and the inter-vehicle distance control is not performed after a cut-in begins, and a second cut-in step in which the cut-in possibility is greater than the second reference value and the inter-vehicle distance control is performed.

The processor 130 may control such that the warning is not performed in the first cut-in step, and the warning is performed in the second cut-in step, and may control such that the warning is performed and a warning level is outputted differently depending on whether the user looks ahead and/or whether the hands of the user are put on a steering wheel. That is, in the second cut-in step, the processor 130 may control such that a visual warning is output when the user looks ahead or the hands of the user are put on the steering wheel. In addition, in the second cut-in step, the processor 130 may control such that an audible warning and/or a tactile warning while outputting a visual warning are output together when the user does not look ahead or the hands of the user are not put on the steering wheel.

In another example, in the first and second cut-in steps, the processor 130 may control such that the warning is performed and the warning level is output differently depending on whether the user looks ahead and/or whether the hand of the user is put on the steering wheel.

That is, the processor 130 may control such that the visual warning is output when the user looks ahead and/or the hand of the user is put on the steering wheel, and an audible warning and/or a tactile warning are/is output while outputting the visual warning when the user does not look ahead or the hands of the user are not put on the steering wheel.

In addition, the processor 130 may perform the inter-vehicle distance control on a cut-in vehicle as a control target based on whether the user looks ahead and/or whether the hand of the user is put on the steering wheel in the first cut-in step, and in the second cut-in step, perform the inter-vehicle distance control on the cut-in vehicle as a control target without regard to whether the user looks ahead and/or whether the hands of the user are put on the steering wheel.

In the first cut-in step, the processor 130 may perform the inter-vehicle distance control on the cut-in vehicle as the control target when the user does not look ahead or the hands of the user are not put on the steering wheel.

In addition, the processor 130 may determine the cut-in possibility that a nearby vehicle cuts in ahead of a lane or road on which the host vehicle travels based on the image data obtained from the image obtaining device 200 and the information about an obstacle received from the sensing module 300, determine the cut-in step of each cut-in possibility, and perform the warning or the inter-vehicle distance control based on whether the user looks ahead and/or whether the hands of the user are put on the steering wheel.

The image obtaining device 200 may photograph the front, left, right, and rear of the vehicle to obtain image data, and may provide the image data to the vehicle control apparatus 100. To this end, the image obtaining device 200 may include a camera.

The sensing module 300 may sense an obstacle around the vehicle to obtain information about the obstacle around the vehicle. The information about an obstacle around the vehicle may include information about a moving direction and/or a type of the obstacle (e.g., a vehicle, a pedestrian, a bicycle, a motorcycle, and the like), information about a location of the obstacle, information about a speed/velocity of the obstacle, and the like. To this end, the sensing module 300 may include an ultrasonic sensor, a radar, a lidar, an acceleration sensor, a yaw rate sensor, a torque measuring sensor, a wheel speed sensor, and the like. In addition, a radar may be additionally provided at a corner in front of the vehicle, thereby further enhancing the accuracy of detecting a cut-in vehicle.

The user monitoring device 400 detects whether the user looks ahead and/or whether the hands of the user are put on the steering wheel. To this end, the user monitoring device 400 may include a camera mounted in a vehicle interior to photograph a user and the processor 130 may determine whether the user looks ahead and whether the hands of the user are put on the steering wheel, based on the image data of the user. In addition, the user monitoring device 400 may include a sensor (e.g., a touch sensor) for detecting whether the hands of the user are put on the steering wheel.

The driving device 500 may control the speed of a vehicle and include an accelerator, a throttle, an actuator interworking with the throttle and the brake, and a controller for controlling the actuator.

The braking device 600 may be configured to control the speed of the vehicle to stop the vehicle, and may include a throttle, a brake, an actuator interworking with the throttle and the brake, and a controller for controlling the actuator.

The display 700 may display map information including the host vehicle and nearby vehicles, and may display image information about a cut-in situation of a nearby vehicle in which the nearby vehicle cuts into the lane or road on which the host vehicle travels ahead of the host vehicle. In addition, the display 700 may display a warning image for collision with nearby vehicles and neglect of the user's attention. The display 700 may be implemented with a head-up display (HUD), a cluster, an audio video navigation (AVN), a side mirror, or the like. In addition, the display 700 may directly receive a color input from the user through a user setting menu (USM) of the cluster. In addition, the display 700 may include at least one of a liquid crystal display (LCD), a thin film transistor liquid crystal display (TFT LCD), a light emitting diode (LED), an organic LED (OLED), an active matrix OLED (AMOLED), a flexible display, a bended display, and a 3D display. Some of these displays may be implemented with a transparent display that is transparent or optically transparent to allow an outside to be viewed. In addition, the display 700 may be provided as a touch screen including a touch panel, and may be used as an input device in addition to an output device.

The warning device 800 may perform visual, tactile and audible warnings. To this end, the warning device 800 may include a display part capable of outputting a warning phrase, a speaker capable of outputting a warning sound, and a vibration motor for a tactile warning of vibration.

Since an existing inter-vehicle distance control system warns only about a control limit situation, that is, a collision danger situation with a preceding vehicle (take-over request) or a recognition limit situation (forward alert notification), there was a great sense of helplessness or discomfort due to abrupt control of the vehicle.

That is, it may be necessary to determine from which time point the cut-in vehicle, which cuts in ahead of the host vehicle from a nearby lane to be in front of the host vehicle, is to be recognized as a control target. In this case, when the cut-in vehicle is determined as the control target at a too early point, control helplessness may occur. In addition, when the cut-in vehicle is determined as the control target too late, it may cause a sense of incongruity or actually collision. Thus, it is possible to info it the user of the cut-in situation before the braking control is performed on the cut-in vehicle to allow the user to recognize in advance that the braking force may be generated, thereby reducing the control helplessness.

Thus, in the present disclosure, before the preceding vehicle in a side lane is determined as a control target, when there is a possibility that the preceding vehicle in the side lane cuts in, the user may be warned in advance and then, the vehicle control may be performed, thereby minimizing a sense of discomfort.

Figure 2:
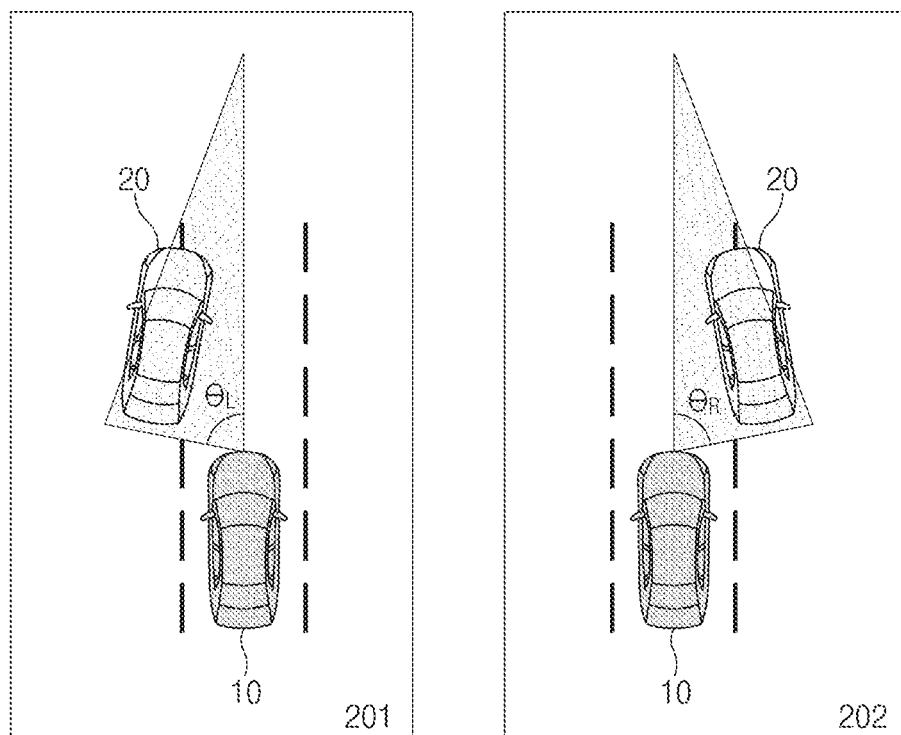
FIG. 2 is a view illustrating a user front view angle when a vehicle control apparatus views a cut-in vehicle according to embodiments of the present disclosure.
Figure 3:
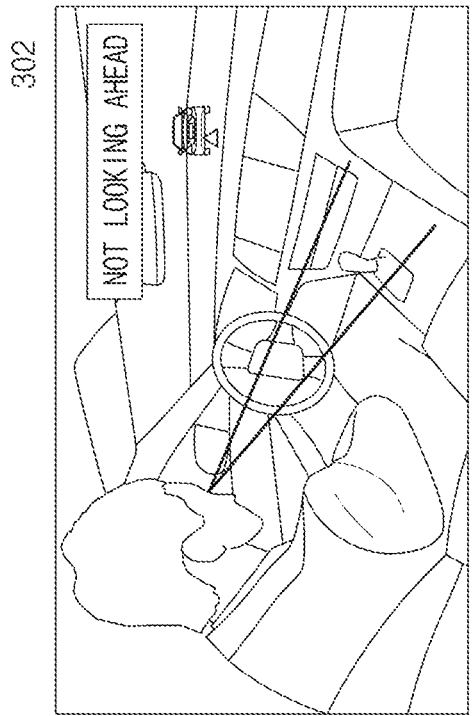
FIG. 3 is a view illustrating a method of determining whether a vehicle control apparatus views a cut-in vehicle according to embodiments of the present disclosure.
Figure 3:
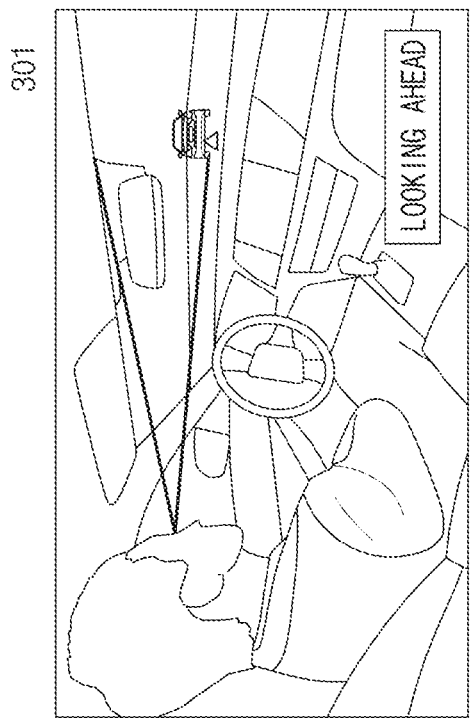

FIG. 2 is a view illustrating a user front view angle when a vehicle control apparatus views a cut-in vehicle according to embodiments of the present disclosure. FIG. 3 is a view illustrating a method of determining whether a vehicle control apparatus views a cut-in vehicle according to embodiments of the present disclosure.

As shown in FIG. 2, the vehicle control apparatus 100 may determine whether the user looks at a cut-in vehicle, in consideration of the front-view angle of the user and the direction of the cut-in vehicle. Reference numeral 201 of FIG. 2 denotes the user front view angle $\theta_L$ when it is determined that the user looks at a left cut-in vehicle. Reference numeral 202 of FIG. 2 denotes the user front view angle $\theta_R$ when it is determined that the user looks at a right cut-in vehicle. Reference numeral 301 of FIG. 3 denotes a case in which the user is looking forward, and reference numeral 302 of FIG. 3 denotes a case in which the user does not look forward.

Figure 4:
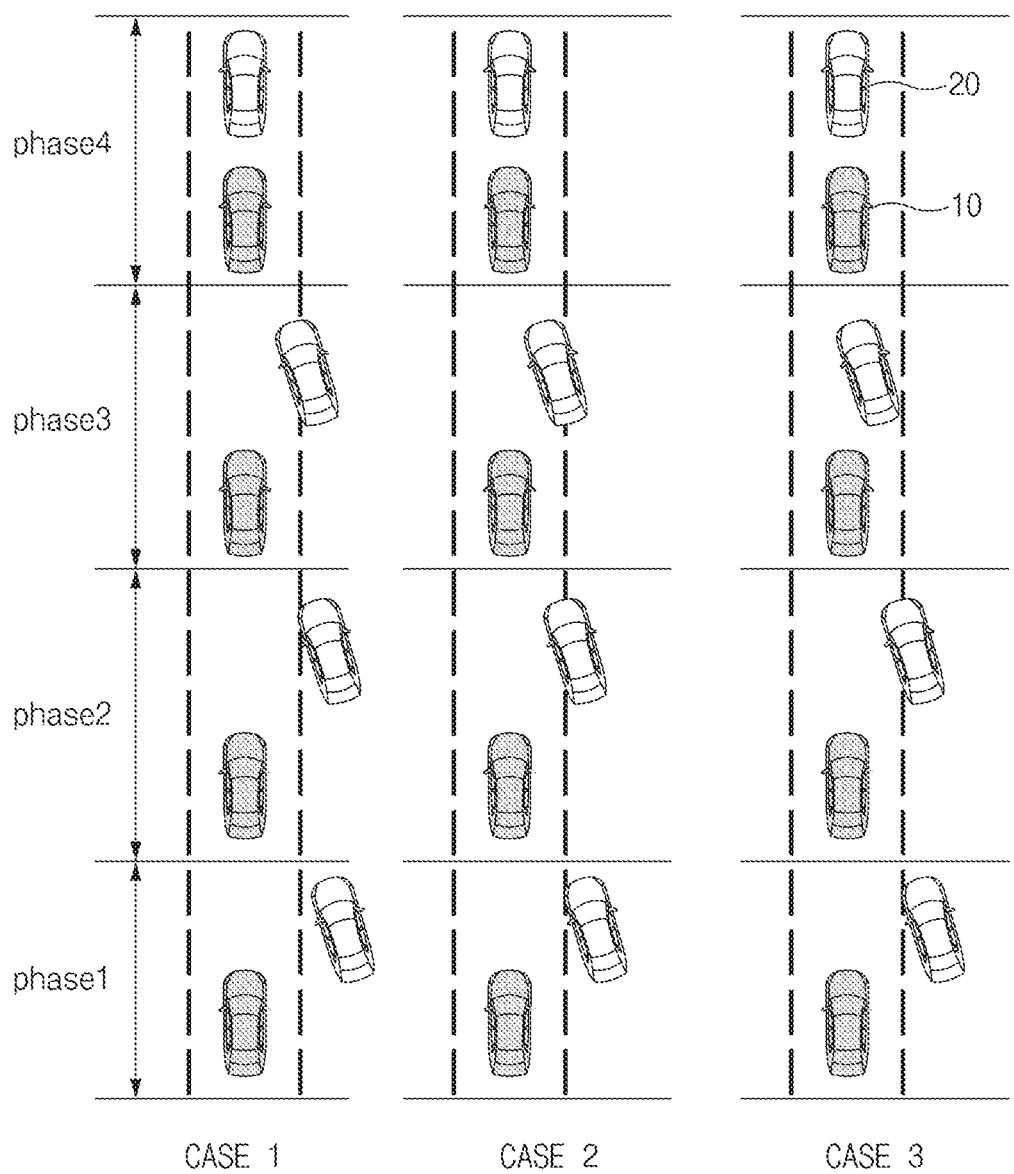
FIG. 4 is a view illustrating an exemplary operation of various cut-in cases of a vehicle control apparatus according to embodiments of the present disclosure.

FIG. 4 is a view illustrating an exemplary operation of various cut-in cases of a vehicle control apparatus according to embodiments of the present disclosure. As shown in FIG. 4, a case is disclosed in which it is determined whether a nearby vehicle 20, which is traveling on a side lane on which the host vehicle 10 is traveling, cuts in front of the host vehicle 10.

Phase 1 is a state in which a nearby vehicle is about to start cut-in, phase 2 is a first cut-in step while the cut-in is in progress, phase 3 is a second cut-in step while the cut-in is in progress, and phase 4 is a state in which the cut-in is completed.

Case 1, case 2 and case 3 of FIG. 4 illustrate different cut-in determination criteria according to the specification of a vehicle. The vehicle control apparatus 100 of the present disclosure may perform warning and/or vehicle control according to the state of the user (e.g., looking ahead, steering wheel hands-on, etc.) in phase 2 which is the first cut-in step of cases 1 to 3.

First, the phase 2 of the case 1 is a state in which the nearby vehicle 20 does not exceed the lane of the host vehicle, and the phase 3 is a state in which the nearby vehicle 20 crosses the lane. The phase 2 of the case 2 is a state in which the nearby vehicle 20 partially crosses the lane of the host vehicle, and the phase 3 is a state in which the nearby vehicle 20 exceeds ⅔ of the lane. The phase 2 of the case 3 is a state in which the nearby vehicle 20 partially crosses the lane of the host vehicle, and the phase 3 is a state in which the nearby vehicle 20 completely crosses the lane and travels in front of the host vehicle 10. In this case, the phase 2 may be set as the first cut-in step and the phase 3 may be set as the second cut-in step, where the first cut-in step may be defined as a step in which the cut-in distance control is not performed although the cut-in possibility is high, and the second cut-in step may be defined as a step in which the cut-in possibility is high and the cut-in distance control is performed.

Thus, according to embodiments of the present disclosure, the warning and/or the vehicle control may be performed in the phase 3 of in all the cases like the related art, and in the phase 2, the warning and/or the vehicle control may be performed according to the state of the user.

When the warning is performed only in the second cut-in step, the specifications of the vehicle control apparatus 100 are illustrated in following Tables 1 and 2.

The following Table 1 shows the specification in the case where the warning is performed only in the second cut-in step, and the user is looking at the cut-in vehicle or the steering wheel is in the hands-on state. That is, the vehicle control apparatus 100 performs the visual warning in the second cut-in step.

TABLE 1

| | Cut-in | Existence | | | Proposal | |
|---|---|---|---|---|---|---|
| | state of nearby vehicle | Cut-in determi- nation | Con- trol | Warn- ing | Cut-in determi- nation | Warn- ing |
| Phase 1 | Cut-in start | X | X | X | | X |
| Phase 2 | Cut-in progress | X | X | X | First step | X |
| Phase 3 | Cut-in progress | ○ | ○ | X | Second step | Visual |
| Phase 4 | Cut-in completion | X (preceding vehicle) | ○ | X | X | X |

The following Table 2 shows the specification in the case where the warning is performed only in the second cut-in step, and the user does not look at the cut-in vehicle or the steering wheel is not in the hands-on state. That is, the vehicle control apparatus 100 performs the visual/audible/tactile warnings in the second cut-in step.

TABLE 2

| | Cut-in | Existence | | | Proposal | |
|---|---|---|---|---|---|---|
| | state of nearby vehicle | Cut-in determi- nation | Con- trol | Warn- ing | Cut-in determi- nation | Warn- ing |
| Phase 1 | Cut-in start | X | X | X | X | X |
| Phase 2 | Cut-in progress | X | X | X | First step | X |
| Phase 3 | Cut-in progress | ○ | ○ | X | Second step | Visual/ audible/ tactile |
| Phase 4 | Cut-in completion | X (preceding vehicle) | ○ | X | X | X |

The following Tables 3 and 4 show the specification in the case where the warning is performed in the first and second cut-in steps. The Table 3 shows the specification in the case where the visual warning is performed in the first and second cut-in steps in which the user is looking at the cut-in vehicle or the steering wheel is in the hands-on state.

TABLE 3

| | Cut-in | Existence | | | Proposal | |
|---|---|---|---|---|---|---|
| | state of nearby vehicle | Cut-in determi- nation | Con- trol | Warn- ing | Cut-in determi- nation | Warn- ing |
| Phase 1 | Cut-in start | X | X | X | X | X |
| Phase 2 | Cut-in progress | X | X | X | First step | Visual |
| Phase 3 | Cut-in progress | ○ | ○ | X | Second step | Visual |
| Phase 4 | Cut-in completion | X (preceding vehicle) | ○ | X | X | X |

The following Table 4 shows the specification in the case where the visual/audible/tactile warnings are performed in the first and second cut-in steps in which the user does not look at the cut-in vehicle or the steering wheel is not in the hands-on state.

TABLE 4

| | Cut-in state of nearby vehicle | Existence | | | Proposal | |
|---|---|---|---|---|---|---|
| | | Cut-in determination | Control | Warning | Cut-in determination | Warning |
| Phase 1 | Cut-in start | X | X | X | X | X |
| Phase 2 | Cut-in progress | X | X | X | First step | Visual/audible/tactile |
| Phase 3 | Cut-in progress | ◯ | ◯ | X | Second step | Visual/audible/tactile |
| Phase4 | Cut-in completion | X (preceding vehicle) | ◯ | X | X | X |

The following Tables 5 and 6 show the specification of the inter-vehicle distance control according to whether the user is looking at the cut-in vehicle. The Table 5 shows the specification in the case where the inter-vehicle distance control is performed in the second cut-in step when the user is looking at the cut-in vehicle or the steering wheel is in the hands-on state.

TABLE 5

| | Cut-in state of nearby vehicle | Existence | | Proposal | |
|---|---|---|---|---|---|
| | | Cut-in determination | Control | Cut-in determination | Control |
| Phase 1 | Cut-in start | X | X | X | X |
| Phase 2 | Cut-in progress | X | X | First step | X |
| Phase 3 | Cut-in progress | ◯ | ◯ | Second step | ◯ |
| Phase 4 | Cut-in completion | X (preceding vehicle) | ◯ | X | ◯ |

The Table 6 shows the specification in the case where the inter-vehicle distance control is performed in the first and second cut-in steps when the user does not look at the cut-in vehicle or the steering wheel is not in the hands-on state

TABLE 6

| | Cut-in state of nearby vehicle | Existence | | Proposal | |
|---|---|---|---|---|---|
| | | Cut-in determination | Control | Cut-in determination | Control |
| Phase 1 | Cut-in start | X | X | X | X |
| Phase 2 | Cut-in progress | X | X | First step | ◯ |
| Phase 3 | Cut-in progress | ◯ | ◯ | Second step | ◯ |
| Phase 4 | Cut-in completion | X (preceding vehicle) | ◯ | X | ◯ |

The following Tables 7 and 8 show the specifications in the case where the front-side alert warning based on whether the user is looking at the cut-in vehicle is fused with the inter-vehicle distance control for the cut-in vehicle. The Table 7 shows the specification in the case where the inter-vehicle distance control is performed in the second cut-in step and the visual warning is performed in the first and second cut-in steps when the user is looking at the cut-in vehicle or the steering wheel is in the hands-on state.

TABLE 7

| | Cut-in state of nearby vehicle | Existence | | | Proposal | | |
|---|---|---|---|---|---|---|---|
| | | Cut-in determination | Control | Warning | Cut-in determination | Control | Warning |
| Phase 1 | Cut-in start | X | X | X | X | X | X |
| Phase 2 | Cut-in progress | X | X | X | First step | X | Visual |
| Phase 3 | Cut-in progress | ◯ | ◯ | X | Second step | ◯ | Visual |
| Phase4 | Cut-in completion | X (preceding vehicle) | ◯ | X | X | ◯ | X |

The Table 8 shows the specification in the case where the inter-vehicle distance control and the visual/audible/tactile warnings are performed in the first and second cut-in steps when the user does not look at the cut-in vehicle or the steering wheel is not in the hands-on state.

TABLE 8

| | Cut-in state of nearby vehicle | Existence | | | Proposal | | |
|---|---|---|---|---|---|---|---|
| | | Cut-in determination | Control | Warning | Cut-in determination | Control | Warning |
| Phase 1 | Cut-in start | X | X | X | X | X | X |
| Phase 2 | Cut-in progress | X | X | X | First step | ◯ | Visual/audible/tactile |
| Phase 3 | Cut-in progress | ◯ | ◯ | X | Second step | ◯ | Visual/audible/tactile |
| Phase4 | Cut-in completion | X (preceding vehicle) | ◯ | X | X | ◯ | X |

Figure 5:
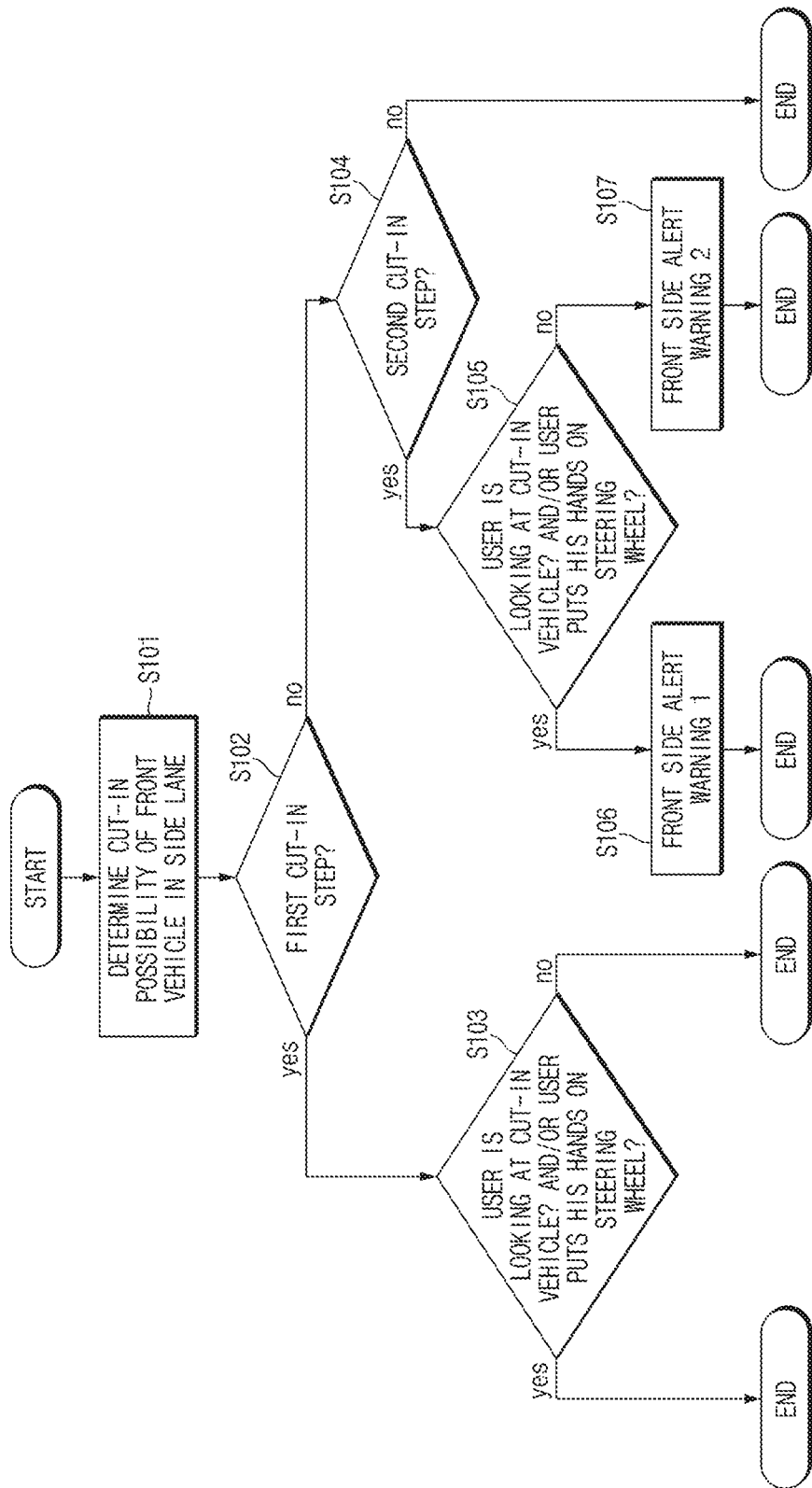
FIG. 5 is a flowchart illustrating a warning method through user state monitoring in a cut-in state of a nearby vehicle according to embodiments of the present disclosure.

Hereinafter, a warning method through user state monitoring in a cut-in state of a nearby vehicle according to embodiments of the present disclosure will be described in detail with reference to FIG. 5. FIG. 5 is a flowchart illustrating a warning method through user state monitoring in a cut-in state of a nearby vehicle according to embodiments of the present disclosure. FIG. 5 illustrates an example of performing a visual warning or visual/audible/tactile warnings based on whether the user looks at the cut-in vehicle and/or whether the steering wheel is in the hands-on state when the vehicle control apparatus 100 does not perform a warning in the first cut-in step and goes to the second cut-in step.

Hereinafter, it is assumed that the vehicle control apparatus 100 of FIG. 1 performs the process of FIG. 5. Further, in the description of FIG. 5, it may be understood that the operations described as being performed by the apparatus are controlled by the processor 130 of the vehicle control apparatus 100.

As shown in FIG. 5, in operation S101, the vehicle control apparatus 100 may determine the possibility that a preceding vehicle in a side lane cuts in. Describing the case 1 of FIG. 4 as an example, the vehicle control apparatus 100 may determine that there is a cut-in possibility in case where a direction angle of the nearby vehicle 20 in the side lane is directed toward the present lane.

In operation S102, the vehicle control apparatus 100 determines a cut-in step based on the moving direction and the speed of the nearby vehicle in the side lane, which has a cut-in possibility. That is, the vehicle control apparatus 100 may determine the cut-in step based on whether the nearby vehicle 20 has entered the lane of the host vehicle. Referring to the case 1 of FIG. 4, the cut-in step may be determined based on how far the nearby vehicle 20 has entered the lane on which the host vehicle 10 travels, based on the moving direction and the moving speed of the nearby vehicle 20 in the side lane, and in the phase 2 of the case 1, may be determined as the first cut-in step. In this case, the first cut-in step may be defined as a step in which the inter-vehicle distance control is not performed while the cut-in possibility is high, and the second cut-in step may be defined as a step in which the cut-in possibility is high and the inter-vehicle distance control is performed.

When the cut-in step is the first cut-in step, in operation S103, the vehicle control apparatus 100 may determine whether the user looks at the cut-in vehicle and/or the user puts his hands on the steering wheel, and the warning is not performed depending on the result of determining whether the user looks at the cut-in vehicle and/or the user puts his hands on the steering wheel.

Meanwhile, when the cut-in step is not the first cut-in step, in operation S104, the vehicle control apparatus 100 determines whether the cut-in step has entered the second cut-in step. In the case 1 of FIG. 4, as in the phase 3, the cut-in step may be determined as the second cut-in step when the nearby vehicle partially enters the lane of the host vehicle.

When the cut-in step is the second cut-in step, in operation S105, the vehicle control apparatus 100 determines whether the user looks at the cut-in vehicle and/or whether the user puts his hands on the steering wheel. When the user is looking at the cut-in vehicle or the user puts his hands on the steering wheel, in operation S106, the vehicle control apparatus 100 performs front side alert warning level 1. In this case, the front side alert warning level 1 may include a visual warning.

Meanwhile, when the user does not look at the cut-in vehicle or the user does not put his hands on the steering wheel, in operation S107, the vehicle control apparatus 100 performs front side alert warning level 2. In this case, the front side alert warning level 2 may include a case of performing not only the visual warning but also the audible or tactile warning.

As described above, according to embodiments of the present disclosure, the vehicle control apparatus 100 may not perform a warning in the first cut-in step, but may perform the visual warning or the visual/audible/tactile warnings based on whether the user is looking at the cut-in vehicle or whether the steering wheel is in the hands-on state when entering the second cut-in step.

Figure 6:
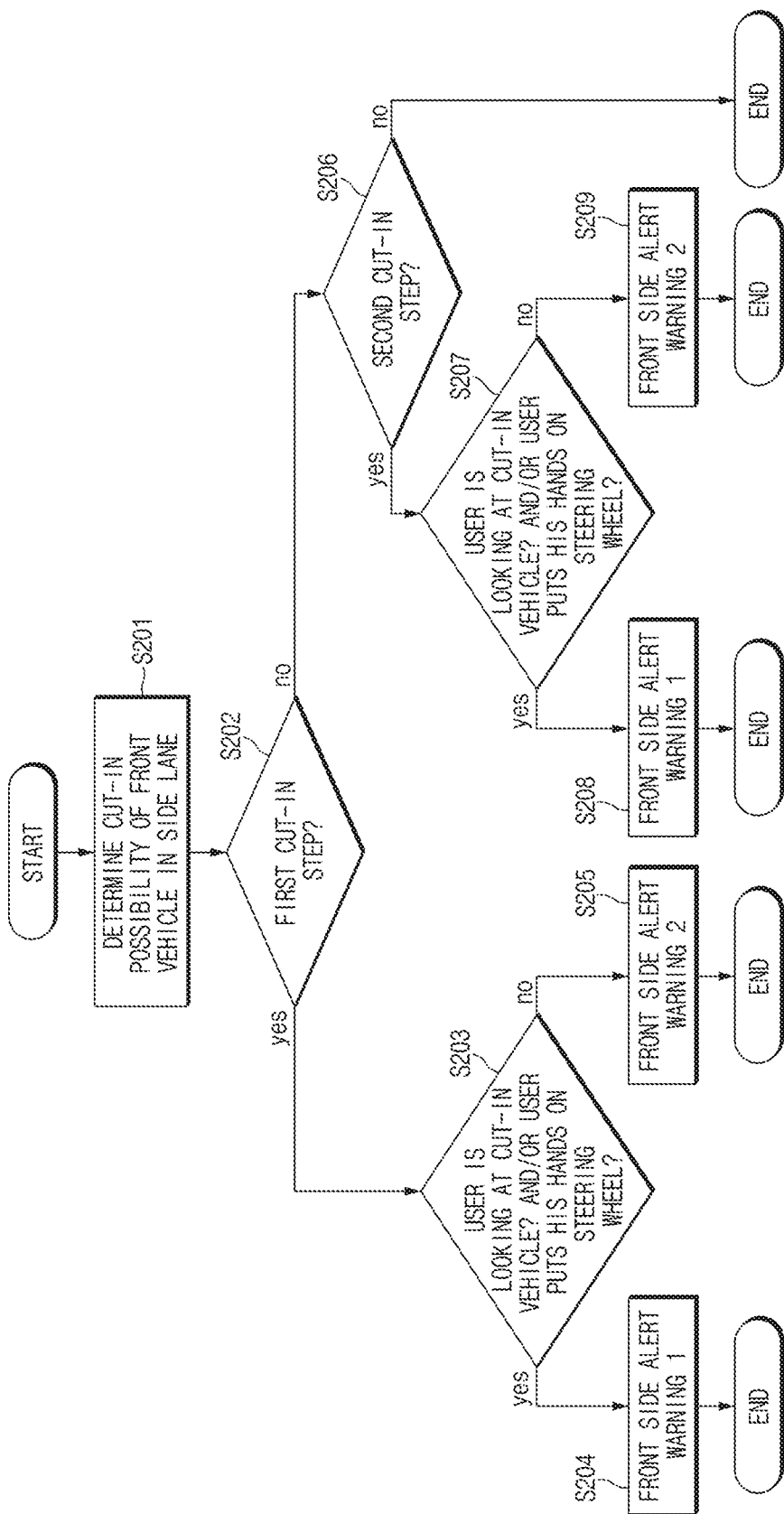
FIG. 6 is an additional flowchart illustrating a warning method through user state monitoring in a cut-in state of a nearby vehicle according to embodiments of the present disclosure.

Hereinafter, an additional warning method through user state monitoring in a cut-in state of a nearby vehicle according to embodiments of the present disclosure will be described in detail with reference to FIG. 6. FIG. 6 is an additional flowchart illustrating a warning method through user state monitoring in a cut-in state of a nearby vehicle according to embodiments of the present disclosure.

FIG. 6 illustrates an example of performing a warning in the first and second cut-in steps and performing a visual warning or visual/audible/tactile warnings based on whether the user looks at the cut-in vehicle and/or whether the steering wheel is in the hands-on state. Hereinafter, it is assumed that the vehicle control apparatus 100 of FIG. 1 performs the process of FIG. 6. Further, in the description of FIG. 6, it may be understood that the operations described as being performed by the apparatus are controlled by the processor 130 of the vehicle control apparatus 100.

As shown in FIG. 6, in operation S201, the vehicle control apparatus 100 may determine the possibility that a preceding vehicle in a side lane cuts in. Describing the case 2 of FIG. 4 as an example, the vehicle control apparatus 100 may determine that there is a cut-in possibility in case where a direction angle of the nearby vehicle 20 in the side lane is directed toward the present lane.

In operation S202, the vehicle control apparatus 100 determines a cut-in step based on the moving direction and the speed of the nearby vehicle in the side lane, which has a cut-in possibility. That is, the vehicle control apparatus 100 may determine the cut-in step based on whether the nearby vehicle 20 has entered the lane of the host vehicle. Describing the case 2 of FIG. 4 as an example, the cut-in step may be determined based on how far the nearby vehicle 20 has entered the lane on which the host vehicle 10 travels, based on the moving direction and the moving speed of the nearby vehicle 20 in the side lane, and may be determined as the first cut-in step in case where the nearby vehicle 20 crosses the present lane as in the phase 2.

When the cut-in step is the first cut-in step, in operation S203, the vehicle control apparatus 100 determines whether the user looks at the cut-in vehicle and/or whether the user puts his hands on the steering wheel. When the user is looking at the cut-in vehicle or the steering wheel is in the hands-on state, in operation S204, the vehicle control apparatus 100 performs front side alert warning level 1. When the user does not look at the cut-in vehicle or the steering wheel is not in the hands-on state, in operation S205, the vehicle control apparatus 100 performs the front side alert warning level 2.

Meanwhile, when the cut-in step is not the first cut-in step, in operation S206, the vehicle control apparatus 100 may determine whether the cut-in step has entered the second cut-in step. As in the phase 3 of the case 2 of FIG. 4, the cut-in step may be determined as the second cut-in step when the nearby vehicle 20 partially enters the lane of the host vehicle.

When the cut-in step is the second cut-in step, in operation S207, the vehicle control apparatus 100 determines whether the user is looking at the cut-in vehicle and/or whether the user puts his hands on the steering wheel. When the user is looking at the cut-in vehicle or the user puts his hands on the steering wheel, in operation S208, the vehicle control apparatus 100 performs front side alert warning level 1. When the user does not look at the cut-in vehicle or the user does not put his hands on the steering wheel, in operation S209, the vehicle control apparatus 100 performs front side alert warning level 2.

As described above, according to embodiments of the present disclosure, the warning may be performed in the first and second cut-in steps, and the visual warning or the visual/audible/tactile warnings may be performed depending on whether the user is looking at the cut-in vehicle and/or whether the steering wheel is in the hands-on state.

Figure 7:
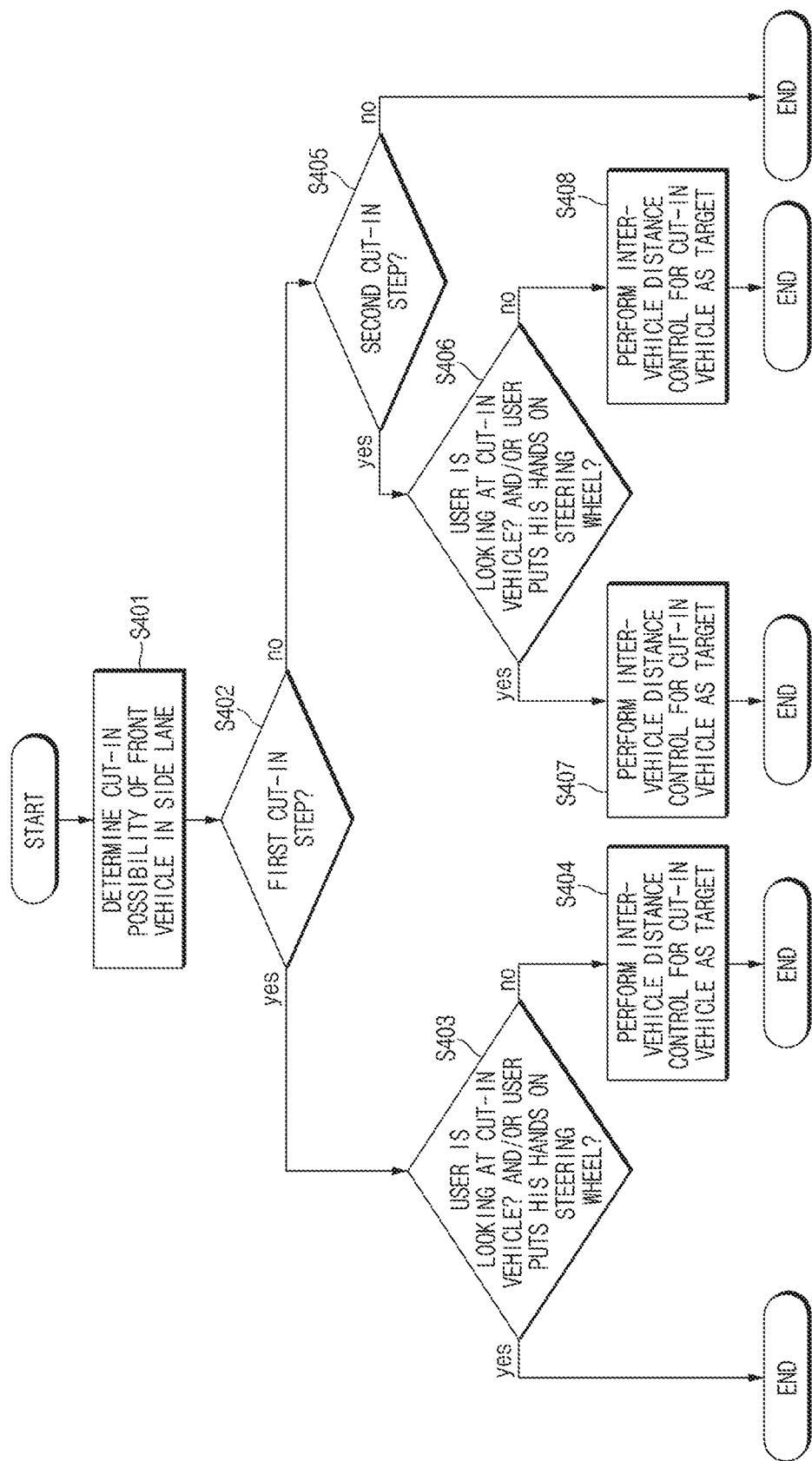
FIG. 7 is a flowchart illustrating a vehicle control method through user state monitoring in a cut-in state of a nearby vehicle according to embodiments of the present disclosure.

Hereinafter, a vehicle control method through user state monitoring in a cut-in state of a nearby vehicle according to embodiments of the present disclosure will be described in detail with reference to FIG. 7. FIG. 7 is a flowchart illustrating a vehicle control method through user state monitoring in a cut-in state of a nearby vehicle according to embodiments of the present disclosure.

FIG. 7 illustrates an example in which, even in the first cut-in step, the inter-vehicle distance control is performed depending on whether a user is looking at a cut-in vehicle and/or whether a steering wheel is in a hands-on state.

Hereinafter, it is assumed that the vehicle control apparatus 100 of FIG. 1 performs the process of FIG. 7. Further, in the description of FIG. 7, it may be understood that the operations described as being performed by the apparatus are controlled by the processor 130 of the vehicle control apparatus 100.

As shown in FIG. 7, in operation S401, the vehicle control apparatus 100 may determine the cut-in possibility of a preceding vehicle in a side lane.

In operation S402, the vehicle control apparatus 100 determines a cut-in step based on the moving direction and the speed of the nearby vehicle in the side lane, which has a cut-in possibility. That is, the vehicle control apparatus 100 may determine the cut-in step based on whether the nearby vehicle 20 has entered the lane of the host vehicle.

When the cut-in step is the first cut-in step, in operation S403, the vehicle control apparatus 100 determines whether the user looks at the cut-in vehicle and/or whether the user puts his hands on the steering wheel. When the user looks at the cut-in vehicle or the steering wheel is in the hands-on state, the vehicle control apparatus 100 does not perform the inter-vehicle distance control.

Meanwhile, when the user does not look at the cut-in vehicle or the steering wheel is not in the hands-on state, in operation S404, the vehicle control apparatus 100 determines the cut-in vehicle as a target (a control object) and performs the inter-vehicle distance control.

Meanwhile, when the cut-in step is not the first cut-in step, in operation S405, the vehicle control apparatus 100 may determine whether the cut-in step has entered the second cut-in step.

When the cut-in step is the second cut-in step, in operation S406, the vehicle control apparatus 100 determines whether the user is looking at the cut-in vehicle and/or whether the user puts his hands on the steering wheel. However, in the second cut-in step, in operation S407 and S408 the vehicle control apparatus 100 determines all cut-in vehicles as targets and performs the inter-vehicle distance control without regard to whether the user is looking at the cut-in vehicle and/or whether the user puts his hands on the steering wheel.

As described above, according to embodiments of the present disclosure, in the first cut-in step, the cut-in vehicle is determined as the target depending on whether the user is looking at the cut-in vehicle and/or whether the steering wheel is in the hands-on state, and in the second cut-in step, the inter-vehicle distance control is always performed.

Figure 8:
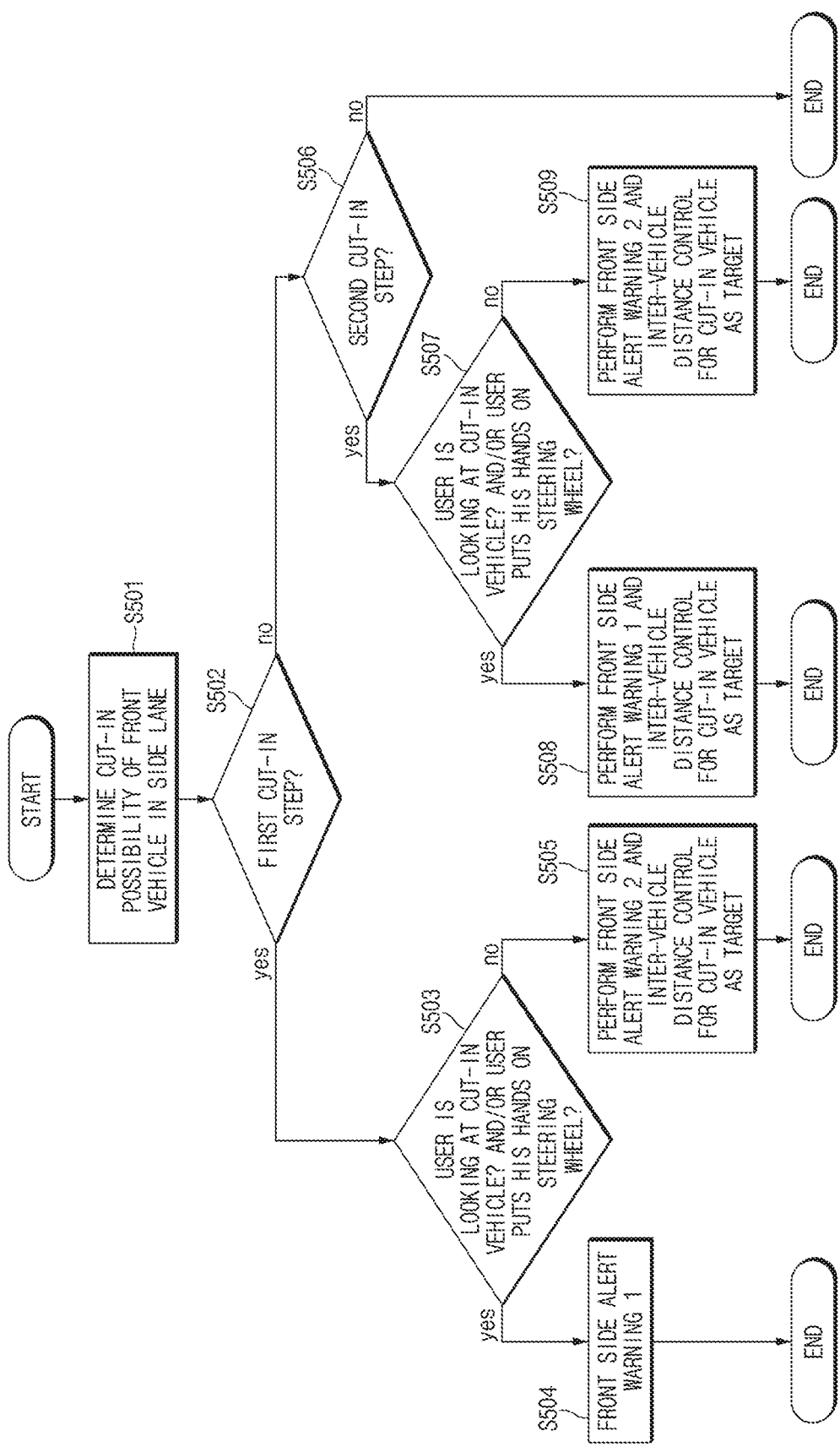
FIG. 8 is an additional flowchart illustrating a warning and vehicle control method through user state monitoring in a cut-in state of a nearby vehicle according to embodiments of the present disclosure.

Hereinafter, a warning and vehicle control method through user state monitoring in a cut-in state of a nearby vehicle according to embodiments of the present disclosure will be described in detail with reference to FIG. 8. FIG. 8 is a flowchart illustrating a warning and vehicle control method through user state monitoring in a cut-in state of a nearby vehicle according to embodiments of the present disclosure. FIG. 8 illustrates an example of simultaneously performing a warning and an inter-vehicle distance control depending on whether a user is looking at a cut-in vehicle and/or whether a steering wheel is in a hands-on state.

Hereinafter, it is assumed that the vehicle control apparatus 100 of FIG. 1 performs the process of FIG. 8. Further, in the description of FIG. 8, it may be understood that the operations described as being performed by the apparatus are controlled by the processor 130 of the vehicle control apparatus 100.

As shown in FIG. 8, in operation S501, the vehicle control apparatus 100 may determine the cut-in possibility of a preceding vehicle in a side lane.

In operation S502, the vehicle control apparatus 100 determines a cut-in step based on the moving direction and the speed of the nearby vehicle in the side lane, which has a cut-in possibility. That is, the vehicle control apparatus 100 may determine the cut-in step based on whether the nearby vehicle 20 has entered the lane of the host vehicle.

When the cut-in step is the first cut-in step, in operation S503, the vehicle control apparatus 100 determines whether the user looks at the cut-in vehicle and/or whether the user puts his hands on the steering wheel. When the user is looking at the cut-in vehicle or the steering wheel is in the hands-on state, the vehicle control apparatus 100 does not perform the inter-vehicle distance control but may perform the front side alert warning level 1.

Meanwhile, when the user does not look at the cut-in vehicle or the steering wheel is not in the hands-on state, the vehicle control apparatus 100, in operation S505, the vehicle control apparatus 100 performs the front side alert warning level 2, determines the cut-in vehicle as a target (a control object), and performs the inter-vehicle distance control.

Meanwhile, when the cut-in step is not the first cut-in step, in operation S506, the vehicle control apparatus 100 may determine whether the cut-in step has entered the second cut-in step.

When the cut-in step is the second cut-in step, in operation S507, the vehicle control apparatus 100 determines whether the user is looking at the cut-in vehicle and/or whether the user puts his hands on the steering wheel. However, in the second cut-in step, in operations S508 and S509, the vehicle control apparatus 100 performs the front side alert warning level 2 without regard to whether the user is looking at the cut-in vehicle and/or whether the user puts his hands on the steering wheel, determines all the cut-in vehicle as targets (control objects), and performs the inter-vehicle distance control.

As described above, according to embodiments of the present disclosure, in the first cut-in step, the warning and cut-in vehicle is determined as a target depending on whether the user is looking at the cut-in vehicle and/or whether the steering wheel is in the hands-on state and the inter-vehicle distance control is performed. In addition to the second cut-in step, the front side alert warning level 2 and the inter-vehicle distance control are always performed.

As described above, according to embodiments of the present disclosure, when the user does not look ahead in a situation where a front side vehicle cuts in, the inter-vehicle distance control is started faster than the related art, so that the risk of collision is reduced even in an abrupt cut-in situation or a short distance cut-in situation.

In addition, according to embodiments of the present disclosure, when a user does not look ahead in a cut-in state of a front side vehicle, the risk of collision may be reduced even in an abrupt cut-in situation or a short distance cut-in situation, and the sense of helplessness and discomfort caused by the controls caused by depreciation or acceleration may be minimized.

According to the present disclosure, it may be possible to broaden the safe driving range by expanding the conventional warning and avoidance assistance concept for the rear side blind zone collision risk to the front and side directions.

Figure 9:
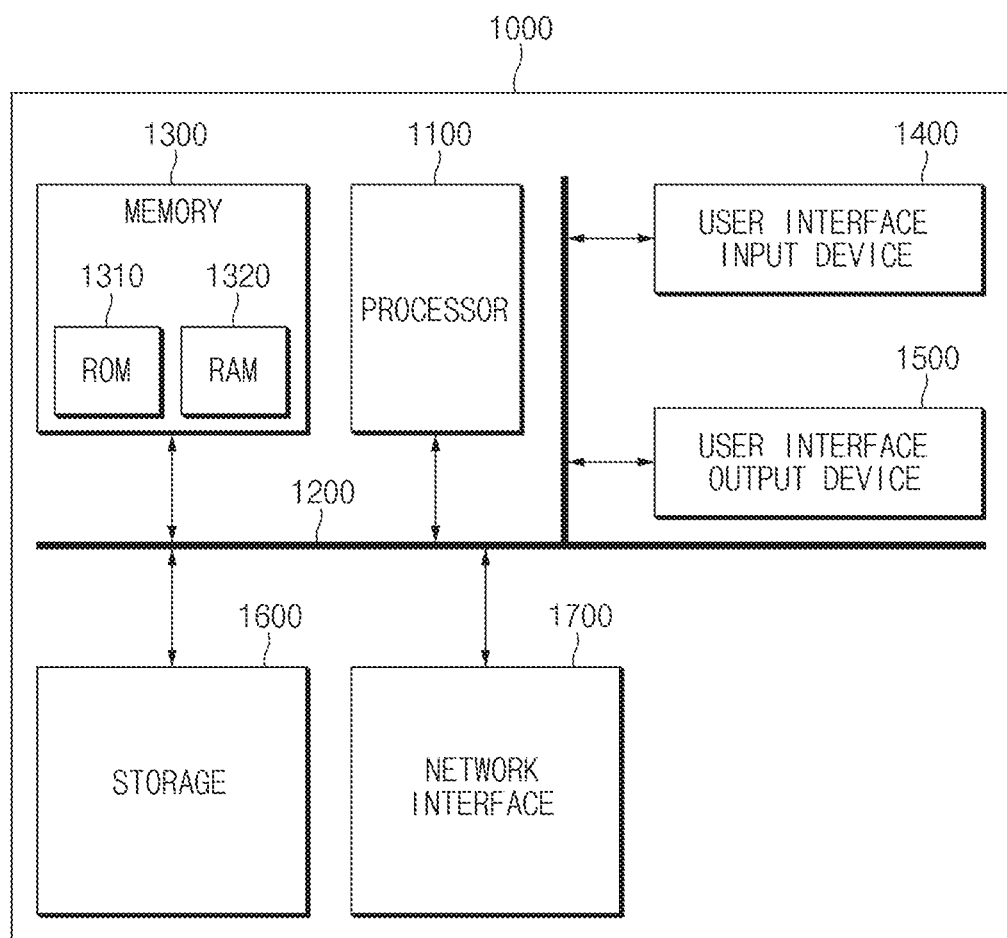
FIG. 9 illustrates a computing system in accordance with embodiments of the present disclosure.

FIG. 9 illustrates a computing system in accordance with embodiments of the present disclosure.

As shown in FIG. 9, a computing system 1000 may include at least one processor 1100, a memory 1300, a user interface input device 1400, a user interface output device 1500, storage 1600, and a network interface 1700, which are connected to each other through a bus 1200.

The processor 1100 may be a central processing unit (CPU) or a semiconductor device which performs processing for instructions stored in the memory device 1300 and/or the storage 1600. The memory 1300 and the storage 1600 may include various types of volatile or non-volatile storage media. For example, the memory 1300 may include a read only memory (ROM) and a random access memory (RAM).

The operations of a method or algorithm described in connection with the embodiments disclosed herein may be embodied directly in hardware, in a software module executed by the processor 1100, or in a combination of the two. The software module may reside in a storage medium (that is, the memory 1300 and/or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), etc.

An exemplary storage medium is coupled to the processor 1100 such that the processor 1100 may read information from, and write information to, the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

According to the present technology, when a possibility that a vehicle in a nearby lane cuts in to be a preceding vehicle in a lane is high, the user may be informed of the cut-in situation in advance, thereby minimizing a sense of control helplessness due to a braking control for the cut-in vehicle.

According to the present disclosure, when the user does not look ahead, a warning may be given to a user or a cut-in vehicle may be selected as a target (control target) earlier than a normal situation to control an inter-vehicle distance, thereby preventing the host vehicle from colliding with front and side vehicles.

In addition, various effects that are directly or indirectly understood through the present disclosure may be provided.

Hereinabove, although the present disclosure has been described with reference to certain embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a host vehicle, the apparatus comprising:
a processor configured to calculate a cut-in possibility in which a nearby vehicle cuts into a lane on which the host vehicle travels, to determine a plurality of cut-in steps of the calculated cut-in possibility, and to control operation of the host vehicle so as to perform an inter-vehicle distance control operation or to provide a warning to a user of the host vehicle based on a state of the user in each of the plurality of cut-in steps; and
storage configured to store the calculated cut-in possibility,
wherein the plurality of cut-in steps include:
a first cut-in step in which the cut-in possibility is greater than a first reference value and less than a second reference value and the inter-vehicle distance control is inhibited after the nearby vehicle cuts into the lane on which the host vehicle travels; and
a second cut-in step in which the cut-in possibility is greater than the second reference value and the inter-vehicle distance control is performed after the nearby vehicle cuts into the lane on which the host vehicle travels.

2. The apparatus according to claim 1, wherein the plurality of cut-in steps include:
a first cut-in step in which the cut-in possibility is greater than a first reference value and less than a second reference value and the inter-vehicle distance control inhibited after the nearby vehicle cuts into the lane on which the host vehicle travels; and
a second cut-in step in which the cut-in possibility is greater than the second reference value and the inter-vehicle distance control is performed after the nearby vehicle cuts into the lane on which the host vehicle travels.

3. The apparatus according to claim 2, wherein the state of the user indicates at least one of whether the user looks ahead and whether a hand of the user is put on a steering wheel of the host vehicle.

4. The apparatus according to claim 3, wherein: in the first cut-in step, the warning is not provided, and in the second cut-in step, the processor is configured to provide the warning and to output a warning level based on at least one of whether the user looks ahead and whether the hand of the user is put on the steering wheel.

5. The apparatus according to claim 4, wherein, in the second cut-in step, the processor is configured to output a visual warning when the user looks ahead or the hand of the user is put on the steering wheel.

6. The apparatus according to claim 4, wherein, in the second cut-in step, the processor is configured to output at least one of an audible warning and a tactile warning while outputting a visual warning when the user does not look ahead or the hand of the user is not put on the steering wheel.

7. The apparatus according to claim 3, wherein, in the first and second cut-in steps, the processor is configured to provide the warning and output a warning level based on at least one of whether the user looks ahead and whether the hand of the user is put on the steering wheel.

8. The apparatus according to claim 7, wherein the processor is configured to: output a visual warning when the user looks ahead or the hand of the user is put on the steering wheel; and output at least one of an audible warning and a tactile warning while outputting the visual warning when the user does not look ahead or the hand of the user is not put on the steering wheel.

9. The apparatus according to claim 3, wherein: in the first cut-in step, the processor is configured to perform the inter-vehicle distance control operation with regard to the nearby vehicle as a control target based on at least one of whether the user looks ahead and whether the hand of the user is put on the steering wheel; and in the second cut-in step, the processor is configured to perform the inter-vehicle distance control operation with regard to the nearby vehicle as the control target without regard to whether the user looks ahead or whether the hand of the user is put on the steering wheel.

10. The apparatus according to claim 9, wherein, in the first cut-in step, the processor is configured to perform the inter-vehicle distance control operation with regard to the nearby vehicle as the control target when the user does not look ahead or the hand of the user is not put on the steering wheel.

11. A method of controlling a host vehicle, the method comprising:
   calculating, by a processor, a cut-in possibility in which a nearby vehicle cuts into a lane on which the host vehicle travels;
   determining, by the processor, a plurality of cut-in steps of the calculated cut-in possibility;
   controlling, by the processor, operation of the host vehicle so as to perform an inter-vehicle distance control operation or to provide a warning to a user of the host vehicle based on a state of the user in each of the plurality of cut-in steps,
   wherein the plurality of cut-in steps include:
      a first cut-in step in which the cut-in possibility is greater than a first reference value and less than a second reference value and the inter-vehicle distance control is inhibited after the nearby vehicle cuts into the lane on which the host vehicle travels; and
      a second cut-in step in which the cut-in possibility is greater than the second reference value and the inter-vehicle control is performed after the nearby vehicle cuts into the lane on which the host vehicle travels.

12. The method according to claim 11, wherein the plurality of cut-in steps include:
   a first cut-in step in which the cut-in possibility is greater than a first reference value and less than a second reference value and the inter-vehicle distance control is inhibited after the nearby vehicle cuts into the lane on which the host vehicle travels; and
   a second cut-in step in which the cut-in possibility is greater than the second reference value and the inter-vehicle control is performed after the nearby vehicle cuts into the lane on which the host vehicle travels.

13. The method according to claim 12, wherein the controlling of the operation of the host vehicle comprises: in the second cut-in step, outputting, by the processor, a visual warning when the user looks ahead or the hand of the user is put on the steering wheel; and in the second cut-in step, outputting, by the processor, at least one of an audible warning and a tactile warning while outputting a visual warning when the user does not look ahead or the hand of the user is not put on the steering wheel, wherein, in the first cut-in step, the warning is not provided.

14. The method according to claim 12, wherein the controlling of the operation of the host vehicle comprises: in the first and second cut-in steps, outputting, by the processor, a warning level based on at least one of whether the user looks ahead and whether the hand of the user is put on the steering wheel.

15. The method according to claim 14, wherein the outputting of the warning level comprises: outputting, by the processor, a visual warning when the user looks ahead or the hand of the user is put on the steering wheel; and outputting, by the processor, at least one of an audible warning and a tactile warning while outputting the visual warning when the user does not look ahead or the hand of the user is not put on the steering wheel.

16. The method according to claim 12, wherein the controlling of the operation of the host vehicle comprises: in the first cut-in step, performing, by the processor, the inter-vehicle distance control operation with regard to the nearby vehicle as a control target based on at least one of whether the user looks ahead and whether the hand of the user is put on the steering wheel; and in the second cut-in step, performing, by the processor, the inter-vehicle distance control operation with regard to the nearby vehicle as the control target without regard to whether the user looks ahead or whether the hand of the user is put on the steering wheel.

* * * * *